Jan. 26, 1937.  C. B. SPASE  2,068,963
POWER TRANSMITTING COUPLING
Filed Aug. 3, 1932  2 Sheets-Sheet 2

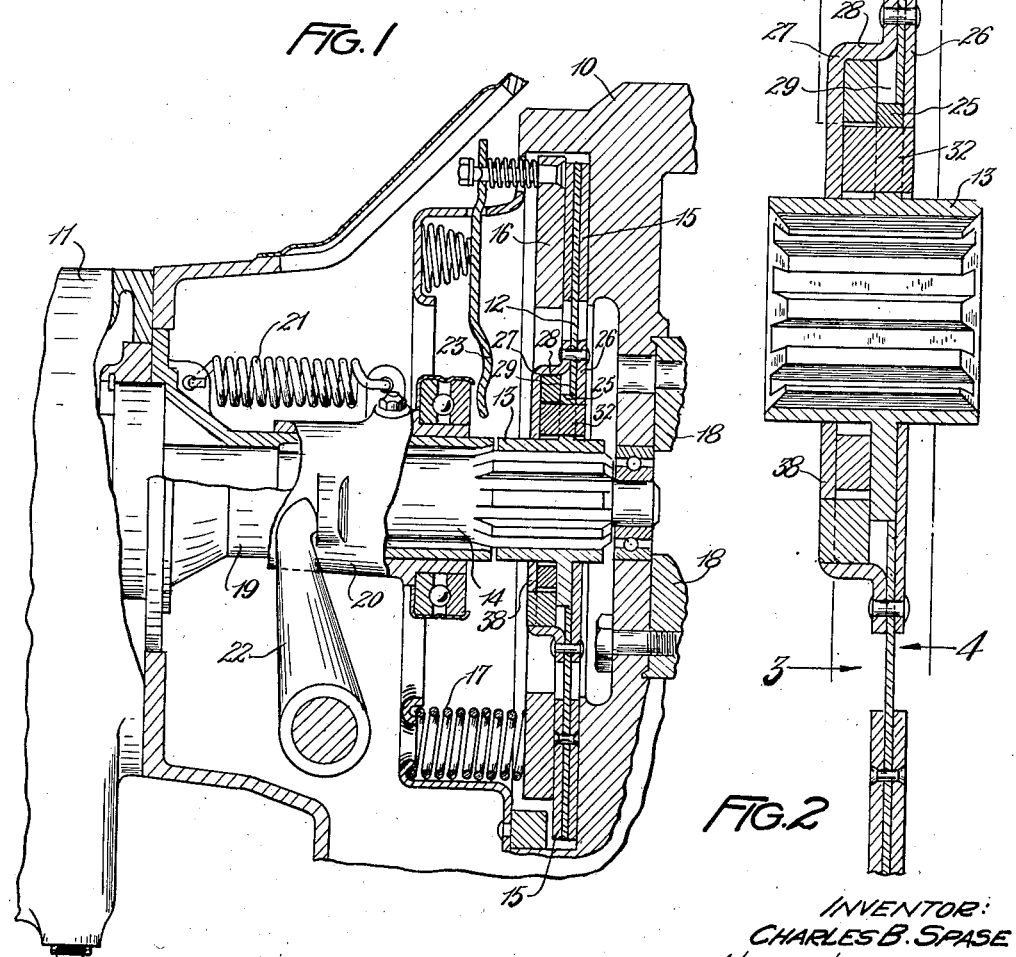

INVENTOR:
CHARLES B. SPASE

ATTORNEYS

Patented Jan. 26, 1937

2,068,963

UNITED STATES PATENT OFFICE 2,068,963

POWER TRANSMITTING COUPLING

Charles B. Spase, Nedrow, N. Y., assignor to Ira Saks, Cleveland Heights, Ohio

Application August 3, 1932, Serial No. 627,391

2 Claims. (Cl. 192—68)

This invention relates to power transmitting devices and, as its principal object, aims to provide a novel torque transmitting coupling having vibration dampening means embodied therein.

Another object of my invention is to provide novel connecting means for a pair of torque transmitting elements wherein the connecting means is constructed and arranged to cooperate with said elements in dampening undesirable vibrations out of the torque being transmitted.

A further object of my invention is to provide a novel coupling device, of the type referred to, wherein the connecting means for the torque transmitting elements has a yieldable portion possessing periods of vibration of a frequency out of phase with that of objectionable vibrations in the torque being transmitted.

Still another object of my invention is to provide a novel connection between the disc and hub of a power transmitting clutch plate, wherein the disc and hub are connected for torque transmitting purposes by a plurality of nested levers having connections respectively with the hub and disc and also having contact means adapted to be pressed against abutment means carried by the disc for dampening vibrations out of the torque being transmitted.

The invention may be further briefly summarized as consisting in certain novel combinations and arrangements of parts hereinafter described and particularly set out in the appended claims.

In the accompanying sheets of drawings.

Fig. 1 is an elevational view, partly in section, showing clutch mechanism having my novel vibration dampening coupling embodied therein;

Fig. 2 is a detached sectional view taken through my novel coupling device;

Figures 3, 4:
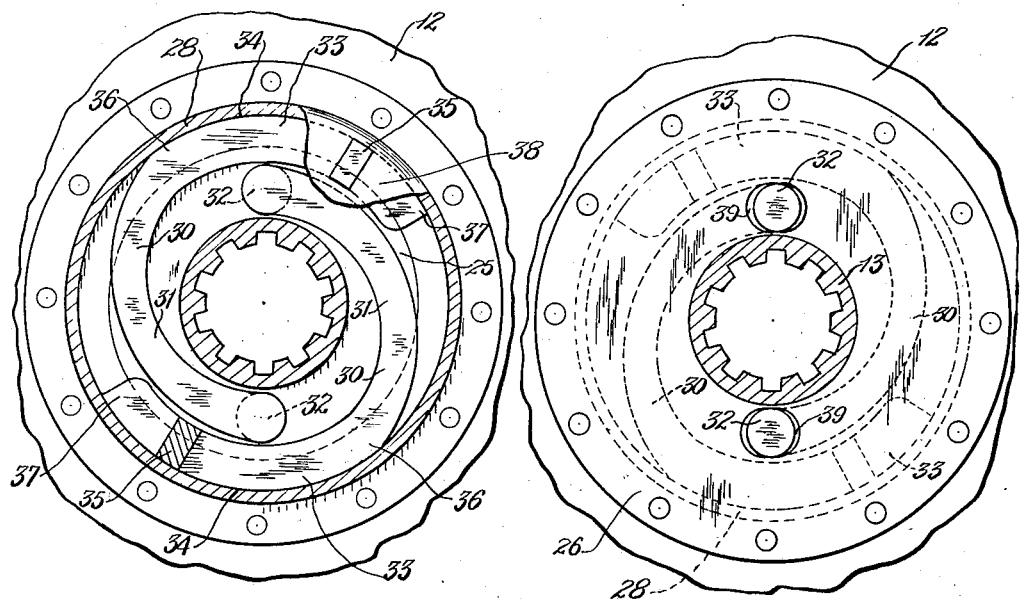
Fig. 3 is a sectional view taken substantially on line 3—3 of Fig. 2.
Fig. 4 is a partial elevational view taken in the direction indicated by the line 4—4 of Fig. 2.

Detailed reference will now be made to the accompanying drawings wherein I have illustrated a novel torque transmitting coupling having vibration dampening means embodied therein, and although this novel coupling is especially suitable for reducing or eliminating objectionable vibrations in the torque being transmitted from the engine crankshaft to the transmission gearing of a motor vehicle, and is herein disclosed as applied to the clutch of a motor vehicle, it should be understood, however, that the invention may be embodied in or applied to various other machines and apparatus.

In Fig. 1 of the drawings, I have shown my novel coupling embodied in a clutch, such as in a manually operable motor vehicle clutch arranged for the transmission of torque between a fly-wheel 10 and the usual gearing arranged in the transmission casing 11. This clutch may be of any well known construction and, as herein illustrated, may be provided with a clutch disc 12 having a hub 13 which is splined to the clutch shaft 14. The clutch disc is provided with friction linings 15 on opposite faces thereof for cooperation with the fly-wheel 10 and the pressure ring 16. The pressure ring and the fly-wheel are normally held against the friction linings by the action of a plurality of springs 17, so that torque may be transmitted from the crankshaft 18 through the fly-wheel and the clutch disc to the shaft 14. A stationary sleeve 19 is usually disposed around the shaft 14 and supports a slidable actuating sleeve 20 which may be moved toward the fly-wheel and in opposition to the sleeve retracting spring 21 by means of the manually operable fork 22. This movement of the sleeve 20 actuates the fingers 23 for moving the pressure ring 16 away from the fly-wheel and thus releases the friction linings and the clutch disc.

According to my invention, the clutch disc 12 is disposed around the radially extending flange 25 of the clutch hub 13 and is provided with spaced retaining members 26 and 27 which are riveted or otherwise suitably secured to the clutch disc, and which surround the hub on opposite sides of the flange 25. As shown in Fig. 2, the member 27 is preferably in the form of a shallow cup-shaped metal stamping or forging, which is disposed with the cylindrical wall portion 28 thereof in coaxial relation with the hub 13, and with the recess of this member facing toward the clutch disc and forming a housing for the flange 25 and the parts cooperating therewith.

To connect the clutch disc with the hub 13 for torque transmitting purposes, I employ arcuate connecting members or levers 30, preferably two in number, which, as shown in Figs. 2 and 3 are disposed in nested relation in the chamber 29, and which straddle the hub. Each of these connecting members is constructed with an arm portion 31 which is drivingly connected with the hub, preferably by providing this arm portion with a lug 32 which extends in the direction of the axis of the hub and engages in an opening provided in the flange 25. These openings are preferably made of such size that the lugs 32 have a press fit therein, and are located in eccentric relation to the axis of the hub but as close as practicable to that axis.

Each of the connecting levers is also formed with an arcuately extending arm, or cam portion 33, having an outer contact surface 34 which cooperates with, and is of substantially the same radius of curvature as the wall portion 28 of the cup-shaped member 27. This arcuate cam portion is drivingly connected with the cup-shaped member, preferably by providing the cam portion with a lug 35, which is disposed between the ends 36 and 37 of this portion, and which engages in an opening in the end wall 38 of the cup-shaped member. The openings which accommodate the lugs 35 are preferably made of a size to receive these lugs with a press fit and, as seen in the drawings, are located at a greater radial distance from the axis of the hub than are the openings for the lugs 32.

The connecting members 30 may be constructed of any suitable material, but are preferably made of steel of high tensile strength, such as spring steel, and, as shown in Fig. 3, the arcuate arm portion 31 of each of these members is reduced somewhat in cross-sectional area, between the lug 32 and the cam end 36, to render this arm portion slightly yieldable for a purpose which will be presently explained.

From the arrangement as thus far described, it will be seen that when torque is transmitted through the clutch disc 12 and the hub 13, there is a tendency for the disc to rotate relative to the hub and that the connecting members prevent such relative rotary movement, with the exception of a very small amount of such relative movement which is desirable for the accomplishment of the vibration dampening function. When the transmission of torque is from the crankshaft 18 to the clutch shaft 14, the clutch disc rotates in a counter-clockwise direction, as seen in Fig. 3. The resistance to turning offered by the shaft 14 causes the arcuate arm portions 31 of the connecting members to be stressed in a direction to cause the cam ends 36 to be pressed against the arcuate abutment, formed by the wall portion 28, with a frictional or snubbing action. When the transmission of torque is from the clutch shaft to the crank shaft the arm portions 31 are stressed in a direction to cause the cam ends 37 to be pressed against the arcuate abutment 28 with a snubbing action. Yielding of the arms 31 of the connecting members during the transmission of torque permits a small amount of relative rotary movement between the clutch hub and disc and, at the same time, the eccentric positions of the lugs 32 and 35 when the latter has a loose fit as hereinafter explained, cause the cam ends 36 or 37, depending upon the direction in which torque is being transmitted, to be pressed against the abutment 28. This combined action of pressing the cam portions against the abutment, at the same time that relative movement takes place between the disc and hub by reason of the flexing of the arm portions 31, results in the snubbing function, referred to above, and which snubbing function I find to be very effective in eliminating vibrations from the torque being transmitted.

In constructing the connecting members with the yieldable arm portions 31, I find that a beneficial result is also obtained in that these yieldable portions are so constructed as to constitute in effect cantilever spring members which possess vibration periods having a frequency different from that of the undesirable torque vibration. In other words the impulses from the motor delivered to the crank shaft tend to produce vibrational periods throughout the driving mechanism. Any torque transmitting element, especially a spring or resilient element having a period of vibration in harmony with such torque vibrations will merely produce cumulative vibrational results. Therefore, by reason of making the yieldable arm portions 31 not only in the form of a cantilever spring but also of such design as to possess a vibrational frequency lower than that of the vibration set up through torque transmission, a substantial and effective vibrational dampening is secured.

Another feature of my invention is the provision of means for preventing flexing of the connecting members to an extent which would result in breakage of these members. According to this feature of my invention I make the lugs 32 long enough to project through the opening provided in the hub flange 25 and to extend into openings 39 provided in the plate 26. As shown in Fig. 4 of the drawings, the openings 39 are elongated to allow movement of the lugs 32 therein, the elongation of these openings being sufficient to permit only such relative movement between the disc and hub as may be necessary for the desired snubbing action of the cam portions. The ends of these openings thus serve as stops for the lugs 32 which stops limit the relative movement between the clutch disc and hub and thereby protect the connecting members against overload.

From the construction and operation of my device, as explained above, it will be seen that the lugs 35 serve as fulcrum points for the cam ends 36 and 37, as well as for establishing a driving connection with the clutch disc. When the lugs 35 have a press fit in the openings of the wall 38, that movement of the cam portions 36 which is required for the snubbing action, is obtained by flexing the connecting members themselves. If desired, however, the openings provided for the lugs 35, and in some instances the openings provided in the flange 25 for the lugs 32, may be elongated slightly to permit limited shifting movement of these lugs therein. Such enlargement of these openings, particularly the openings for the lugs 35, allows a rocking of the cam portions upon the lugs 35, as fulcrums, for pressing the cam ends against the abutment 28 without flexing of the connecting members.

Figure 5:
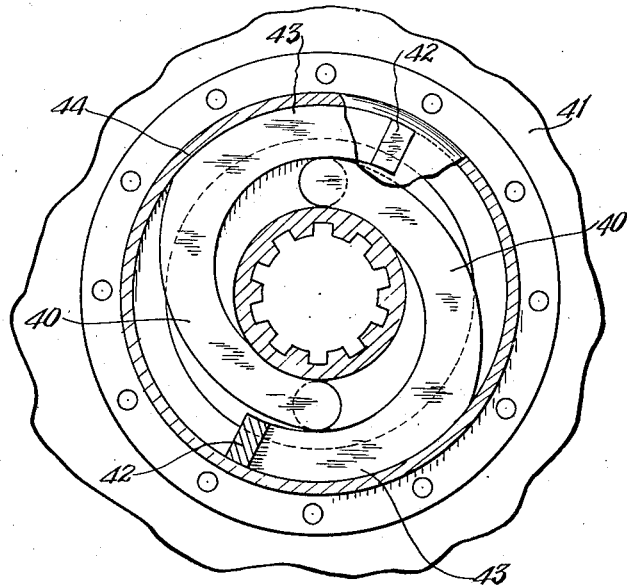
Fig. 5 is an elevational view similar to that of Fig. 3, but showing another torque transmitting coupling embodying my invention.

In Fig. 5 of the drawings I have shown another torque transmitting coupling having a pair of nested arcuate connecting members or levers 40 for connecting the clutch disc 41 with the clutch hub for torque transmitting purposes, which connecting members are identical in construction and arrangement with the connecting members shown in Fig. 3, with the exception that the driving and fulcruming lugs 42 are located at the extreme end of the arcuate cam portions 43. In other words, the connecting members 40 of Fig. 5 differ from the connecting members of Fig. 3, principally in that the end portions 37 have been omitted from the arcuate cams. In this modified construction, the arcuate cam portions 43 are pressed against the abutment 44 of the clutch disc, with the snubbing action explained above, and produce a vibration dampening effect during the transmission of torque through the clutch elements from the flywheel to the clutch shaft.

From the foregoing description and the accompanying drawings it should now be understood that I have provided a novel form of torque transmitting coupling which may be embodied in a vehicle clutch, or in other power transmitting apparatus, and which effectively dampens objectionable periodic vibrations out of the torque being transmitted. It will also be seen that this novel vibration dampening means is of simple and compact construction and can be readily embodied in various forms of power transmitting equipment.

While I have illustrated and described the device of my invention in a detailed manner, it should be understood, however, that I do not wish to be limited to the precise details of construction and arrangements of parts illustrated and described, but regard my invention as including such changes and modifications as do not involve a departure from the spirit of the invention and the scope of the appended claims.

Having thus described my invention, I claim:

1. In apparatus for transmitting torque to or from the crankshaft of a vehicle engine the combination of a pair of coaxial rotatable elements, abutment means associated with one of said elements, a member connecting said elements for torque transmission purposes, said member having spaced contact portions and a lever arm portion for pressing one of said contact portions against said abutment means when torque is being transmitted from said crankshaft and for pressing another of said contact portions against said abutment means when torque is being transmitted to said crankshaft, said lever arm portion being yieldable under the action of the torque being transmitted to permit relative movement between said elements whereby said contact portions cooperate frictionally with said abutment means to eliminate vibration from the torque being transmitted.

2. In a clutch plate having a hub and disc movable with respect to each other, the combination of a plurality of torque transmitting members connecting said hub and said disc, said members having a relatively rigid contact portion and a yieldable portion, said rigid contact portion being secured to said disc, and said yieldable portion being secured to said hub, an abutment member on said disc normally contacting said contact portions, said yieldable portions being spaced from said abutment member and adapted to press said contact portions thereagainst upon relative movement of said hub and of said disc.

CHARLES B. SPASE.